United States Patent
Schilling et al.

(10) Patent No.: US 12,187,110 B2
(45) Date of Patent: Jan. 7, 2025

(54) BODY STRUCTURE FOR AN ELECTRICALLY OPERATED VEHICLE

(71) Applicant: Volkswagen Aktiengesellschaft, Wolfsburg (DE)

(72) Inventors: Thomas Schilling, Sassenburg (DE); Nicole Wallmann, Knesebeck (DE); Ingo Lueken, Tappenbeck (DE); Werner Krauth, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 513 days.

(21) Appl. No.: 17/584,072

(22) Filed: Jan. 25, 2022

(65) Prior Publication Data

US 2022/0144067 A1    May 12, 2022

Related U.S. Application Data

(63) Continuation of application No. PCT/EP2020/066020, filed on Jun. 10, 2020.

(30) Foreign Application Priority Data

Jul. 25, 2019    (DE) .................... 10 2019 211 108.4

(51) Int. Cl.
*B60K 1/04*     (2019.01)
*B60L 50/60*    (2019.01)
*B62D 25/20*    (2006.01)

(52) U.S. Cl.
CPC ............... *B60K 1/04* (2013.01); *B60L 50/66* (2019.02); *B62D 25/2036* (2013.01); *B60K 2001/0438* (2013.01)

(58) Field of Classification Search
CPC ................................................. B62D 25/2036
See application file for complete search history.

(56) References Cited

U.S. PATENT DOCUMENTS

| 4,618,163 A | 10/1986 | Hasler et al. |
|---|---|---|
| 5,112,102 A | 5/1992 | Wurl |

(Continued)

FOREIGN PATENT DOCUMENTS

| CH | 293838 A | 10/1953 |
|---|---|---|
| CN | 104340282 A | 2/2015 |

(Continued)

OTHER PUBLICATIONS

International Search Report dated Sep. 30, 2020 in corresponding application PCT/EP2020/066020.

*Primary Examiner* — Anne M Boehler
*Assistant Examiner* — Hosam Shabara
(74) *Attorney, Agent, or Firm* — Muncy, Geissler, Olds & Lowe, P.C.

(57) ABSTRACT

A body structure for an electrically operated vehicle, having an installation space for a traction battery, which space is open toward the vehicle bottom in the vertical vehicle direction, is closed toward the vehicle top by a floor pan part that forms the vehicle floor, and is delimited on both sides in the transverse vehicle direction by a rocker panel that delimits a side-door opening toward the vehicle bottom, wherein a rear body longitudinal member that transitions into the respective rocker panel toward the front of the vehicle in the longitudinal vehicle direction extends on each vehicle side in the rear-end region, and wherein the relevant rear corner of the traction battery is enclosed by an interior corner region, in particular right-angled interior corner region, that stretches between the rocker panel and the front battery cross member.

9 Claims, 6 Drawing Sheets

(56) References Cited

U.S. PATENT DOCUMENTS

| | | | |
|---|---|---|---|
| 8,696,051 B2 * | 4/2014 | Charbonneau | B62D 25/025 |
| | | | 296/187.12 |
| 9,579,963 B2 | 2/2017 | Landgraf | |
| 9,610,983 B2 | 4/2017 | Mildner et al. | |
| 9,944,162 B2 | 4/2018 | Li | |
| 10,787,070 B2 | 9/2020 | Kappich | |
| 11,088,416 B2 * | 8/2021 | Popovski | H01M 50/242 |
| 11,661,115 B2 * | 5/2023 | Rose | B62D 25/2018 |
| | | | 296/193.02 |
| 11,794,564 B2 * | 10/2023 | Dupper | B62D 25/025 |
| 11,858,331 B2 * | 1/2024 | Krauth | B62D 25/20 |
| 2010/0072786 A1 | 3/2010 | Koyama et al. | |
| 2013/0088044 A1 | 4/2013 | Charbonneau et al. | |
| 2015/0251705 A1 * | 9/2015 | Mildner | B62D 25/2036 |
| | | | 296/187.08 |

FOREIGN PATENT DOCUMENTS

| | | |
|---|---|---|
| CN | 104890738 A | 4/2017 |
| CN | 108725597 A | 11/2018 |
| CN | 109204465 A | 1/2019 |
| DE | 4013784 A1 | 11/1991 |
| DE | 4204826 A1 | 6/1993 |
| DE | 19506160 A1 | 8/1996 |
| DE | 19963068 A1 | 6/2001 |
| DE | 102011100323 A1 | 11/2012 |
| DE | 102011100624 A1 | 11/2012 |
| DE | 102013015531 A1 | 7/2014 |
| EP | 0146716 A2 | 7/1985 |
| JP | H0244578 U | 3/1990 |
| JP | 2006035934 A | 2/2006 |
| JP | 2019048622 A | 3/2019 |
| WO | WO2015113579 A1 | 8/2015 |

\* cited by examiner

BODY STRUCTURE FOR AN ELECTRICALLY OPERATED VEHICLE

This nonprovisional application is a continuation of International Application No. PCT/EP2020/066020, which was filed on Jun. 10, 2020, and which claims priority to German Patent Application No. 10 2019 211 108.40, which was filed in Germany on Jul. 25, 2019, and which are both herein incorporated by reference.

BACKGROUND OF THE INVENTION

Field of the Invention

The present invention relates to a body structure for an electrically operated vehicle.

Description of the Background Art

In the case of an electrically operated, two-track vehicle, a rectangular traction battery can be inserted from below the vehicle into an installation space that is open at the bottom. The battery installation space can be delimited in the longitudinal direction of the vehicle by front and rear battery cross members and be delimited in the transverse direction of the vehicle by lateral rocker panels, which connect the front/rear battery cross members to one another. The traction battery can have a circumferential housing flange on its battery housing. When the traction battery is inserted in the installation space on the body side, the battery housing flange is screwed to the underside of the rocker panels and to the underside of the front/rear battery cross members.

In a generic body structure, a rear body longitudinal member that transitions into the respective rocker panel toward the front of the vehicle in the longitudinal vehicle direction is arranged on each vehicle side in the rear-end region. The relevant rear corner of the traction battery is enclosed by a right-angled interior corner region that stretches between the rocker panel and the rear battery cross member.

With regard to a body structure as a rigid assembly in the event of a rear-end collision, in the prior art the rear body longitudinal member and the rocker panel that adjoins it toward the front of the vehicle can extend in longitudinal alignment. In the event of a rear-end collision, this results in a crash-favorable transmission of force from the vehicle rear end to the vehicle front end facing away from the crash, specifically while relieving force on the crash-sensitive traction battery to a great extent. However, in this case the traction battery has comparatively narrow dimensions in the transverse vehicle direction, with commensurately reduced battery capacity.

From DE 10 2013 015 531 A1, a motor vehicle bodyshell is known as well as a manufacturing method for such a bodyshell. A vehicle with built-in traction battery is known from DE 10 2011 100 624 A1.

SUMMARY OF THE INVENTION

It is therefore an object of the present invention to provide a body structure for an electrically operated vehicle in which crash safety is provided in the event of a rear-end collision on the one hand, and on the other hand the battery capacity of the crash-sensitive traction battery is increased in comparison with the prior art.

According to the invention, the rocker panel and the rear body longitudinal member adjoining it are no longer oriented in longitudinal alignment with one another. Instead, the rocker panel is offset toward the exterior of the vehicle with respect to the rear body longitudinal member by a lateral offset in the transverse direction of the vehicle. In this way, installation space for the traction battery is gained in the vehicle transverse direction as compared to the prior art. The traction battery can thus have substantially wider dimensions, by which means its battery capacity is increased. In order to provide crash safety in the event of a rear-end collision, a rear corner joint adjoins the rear body longitudinal member toward the vehicle front in the longitudinal vehicle direction. The rear corner joint is widened toward the vehicle front, taking up the lateral offset, and is connected to the rocker panel in a force-transmitting manner (at a rocker panel connecting point). In this way, the rear end crash force in the event of a rear-end collision can be transmitted in the direction of the vehicle front end while relieving the traction battery of force.

The rear body longitudinal member can be a profile part that is U-shaped in cross-section with a longitudinal member floor as well as inner and outer side walls raised therefrom. The U-profile of the body longitudinal member, which is open toward the top, can be closed in the assembled state by a rear floor pan part. The outer side wall of the rear longitudinal member can delimit a wheel space of the rear-end wheel well toward the interior of the vehicle in the transverse vehicle direction.

A rocker panel connecting point as a rigid assembly at the rear body longitudinal member is of particular importance. Against this background, the outer side wall of the rear body longitudinal member can be lengthened toward the front of the vehicle at a transition edge with a rocker panel end piece projecting toward the exterior of the vehicle in the transverse vehicle direction. The rocker panel terminates at the rocker panel end piece in a force-transmitting manner (through a weld joint, for example). The rocker panel end piece also delimits the wheel space of the rear-end wheel well toward the front of the vehicle in the longitudinal vehicle direction.

To further increase the assembly rigidity of the rocker panel connecting point, the longitudinal member floor of the rear-end body longitudinal member can be lengthened toward the front of the vehicle with a joining section that engages under the rocker panel and is connected to it in a force-transmitting manner (weld joint, for example).

The rear body longitudinal member can additionally be connected in a force-transmitting manner to the rear battery cross member in the rear longitudinal member corner joint. In one technical implementation, the longitudinal member floor of the rear body longitudinal member can be lengthened toward the front of the vehicle with a floor segment for this purpose. The floor segment can engage under the rear battery cross member and be connected to it in a force-transmitting manner (by welding, for example).

The rear battery cross member can be a U-shaped profile part with a cross member floor as well as front and rear side walls raised therefrom. The profile of the rear battery cross member, which is open toward the top, can be closed in the assembled state by a rear floor pan part.

With regard to proper transmission of force in the event of a lateral collision, it is preferred when the front side wall of the rear battery cross member is carried in the transverse vehicle direction until it is in force-transmitting contact (which is to say in a weld joint) with the rocker panel. The front side wall of the battery cross member delimits the battery installation space and, together with the rocker panel, spans the interior corner region of the battery installation space. For a connection as a rigid assembly, the floor segment of the rear body longitudinal member and the cross member floor of the rear battery cross member can be connected to one another, creating a double-wall structure as a rigid assembly (for example, by welding).

In the event of a rear-end collision, a rocker panel load path results that incorporates the outer side wall as well as the longitudinal member floor of the rear body longitudinal member. In order to reinforce the rocker panel load path, a rocker panel partition part can be provided. The rocker panel partition part can lengthen the outer side wall of the rear body longitudinal member toward the vehicle front in the region of the transition edge to the rocker panel end piece. For this purpose, it is possible to form in the rear side wall of the rear battery cross member an assembly cutout through which the rocker panel partition part extends until force-transmitting contact is made with the front side wall of the rear battery cross member.

Moreover, in the event of a rear-end collision, a battery load path can be formed (parallel to the rocker panel load path). The inner side wall and the longitudinal member floor of the rear body longitudinal member as well as the front side wall of the battery cross member can be incorporated into the battery load path. In order to reinforce the battery load path, the inner side wall of the rear body longitudinal member can be lengthened with a battery partition part. The battery partition part (analogously to the rocker panel partition part) can be passed through the assembly cutout of the rear side wall of the rear battery cross member until force-transmitting contact is made with the front side wall of the battery cross member.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
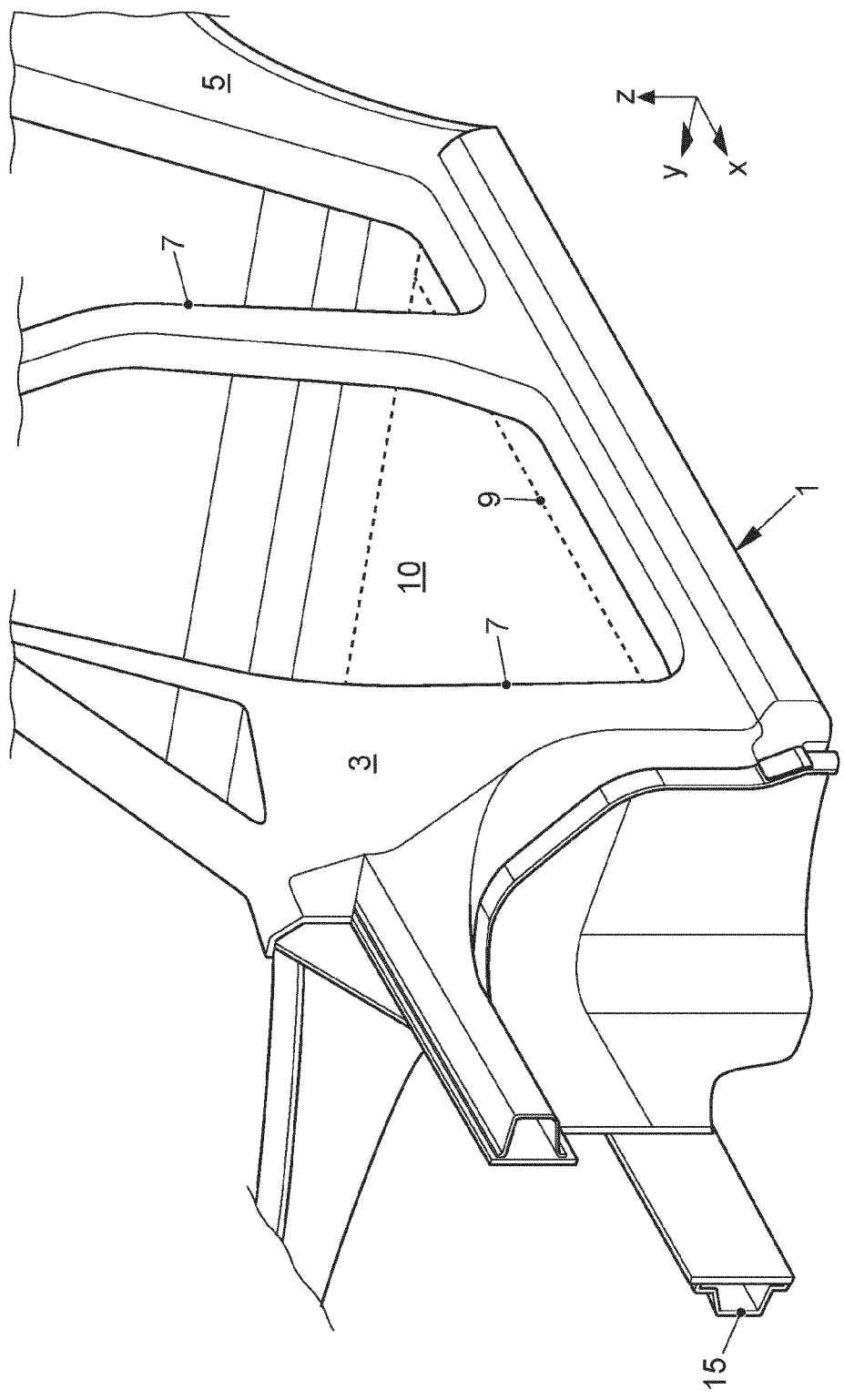
FIG. 1 is a body structure of a two-track motor vehicle in a perspective partial view.
Figure 2:
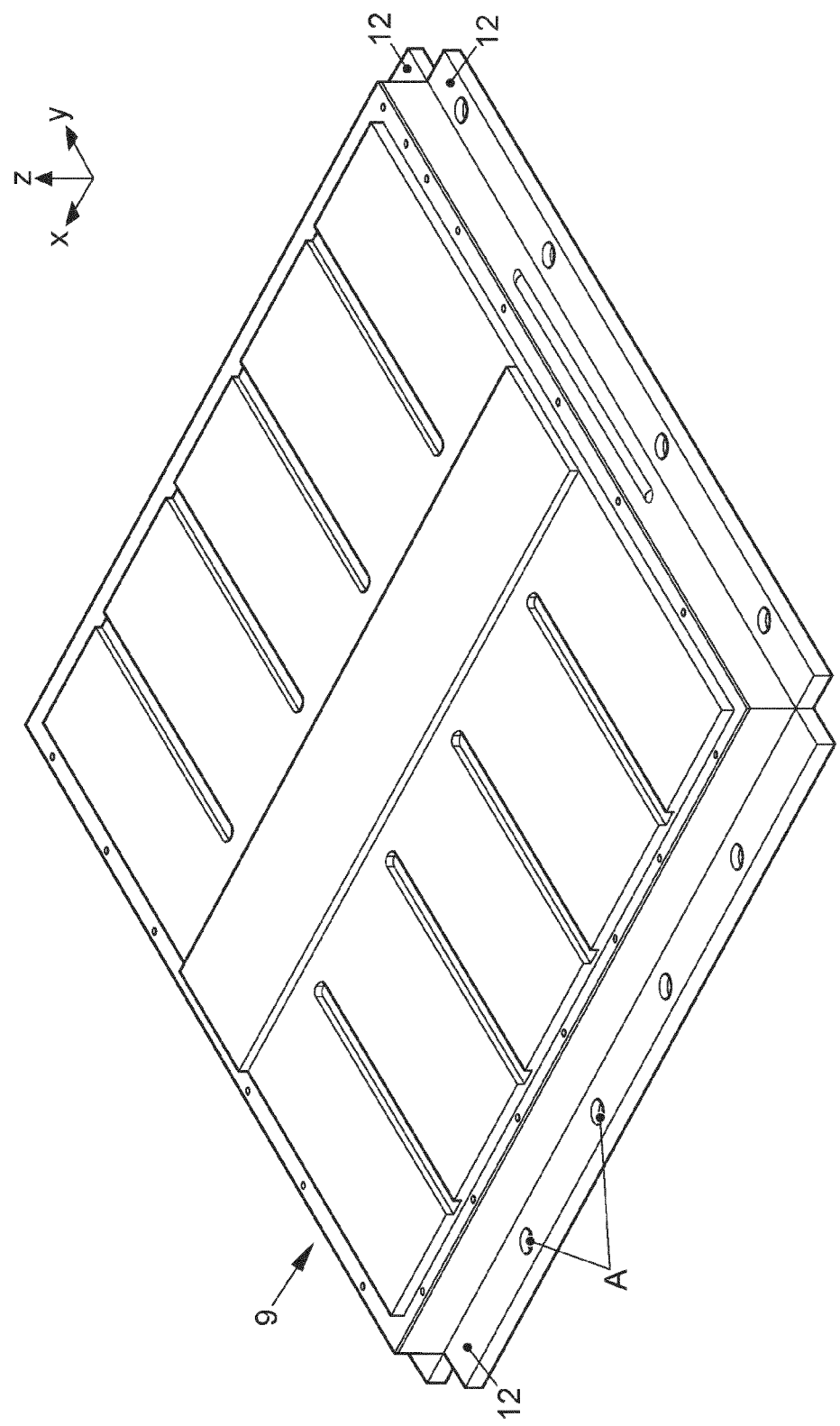
FIG. 2 is a traction battery alone in a perspective representation.
Figure 3:
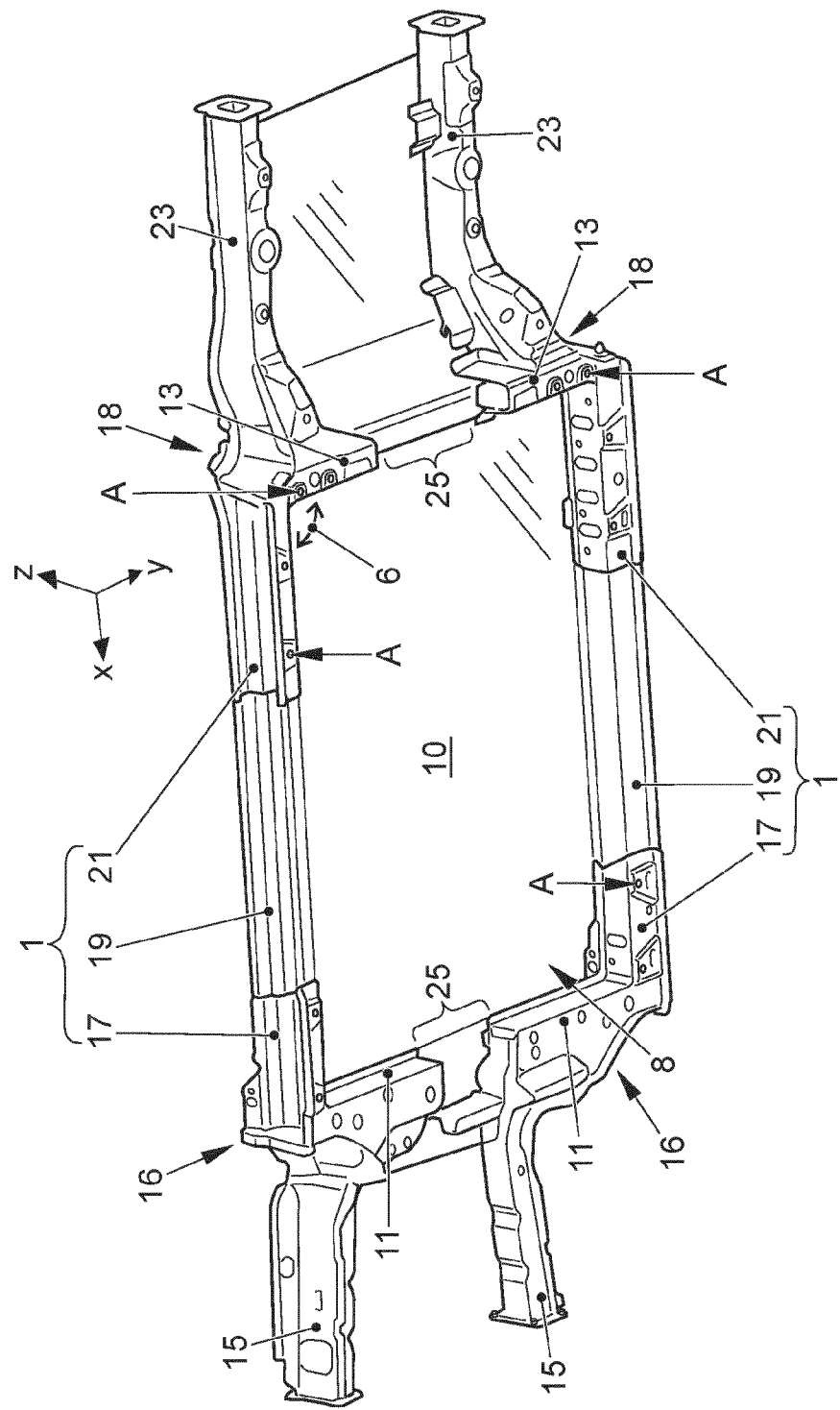
FIG. 3 is an undercarriage of the body structure with traction battery removed.

In FIG. 1, a body structure of a two-track vehicle is shown that is described below to the extent necessary for understanding the invention. Accordingly, the body structure has two lateral rocker panels 1 extending in the longitudinal vehicle direction x, of which only one is shown in FIG. 1. The rocker panel 1 extends in the longitudinal vehicle direction x between a front A-pillar 3 and a rear C-pillar 5, and delimits side-door openings 7 on the floor side. A crash-sensitive traction battery 9 (FIG. 2) is installed in the vehicle floor of the body structure. This battery is positioned beneath a floor pan part 10 (FIG. 3) in an installation space 8 (FIG. 3). The installation space 8 extends in the transverse vehicle direction y between the two rocker panels 1. In the longitudinal vehicle direction x, the installation space 8 extends between a front battery cross member 11 and a rear battery cross member 13. In FIG. 2, the traction battery 9 has a circumferential housing flange 12, which can be screwed to the underside of the rocker panels 1 as well as the battery cross members 11, 13 via screw points A.

As is evident from FIG. 3, a front body longitudinal member 15 that transitions into the respective rocker panel 1 toward the rear of the vehicle in the longitudinal vehicle direction x, with the interposition of a hollow profile corner joint 16, extends on each vehicle side in the front-end region of the body structure. In the further course toward the rear of the vehicle, each rocker panel 1 is adjoined by a rear corner joint 18, which transitions into a rear body longitudinal member 23.

In FIG. 3, the rocker panel 1 is constructed in multiple parts in the longitudinal vehicle direction x, namely with a front connecting element 17, a center section 19, and a rear connecting element 21, which is adjoined by the rear corner joint 18. Moreover, only an inner part of the rocker panel 1 is shown in the figures, while an outer rocker panel part is omitted. In FIG. 3, the front and rear battery cross members 11, 13 are not designed to be completely continuous in the transverse vehicle direction y, but rather are at least partially interrupted in the vehicle center with a supply access 25, through which supply lines can be installed.

Figure 7:
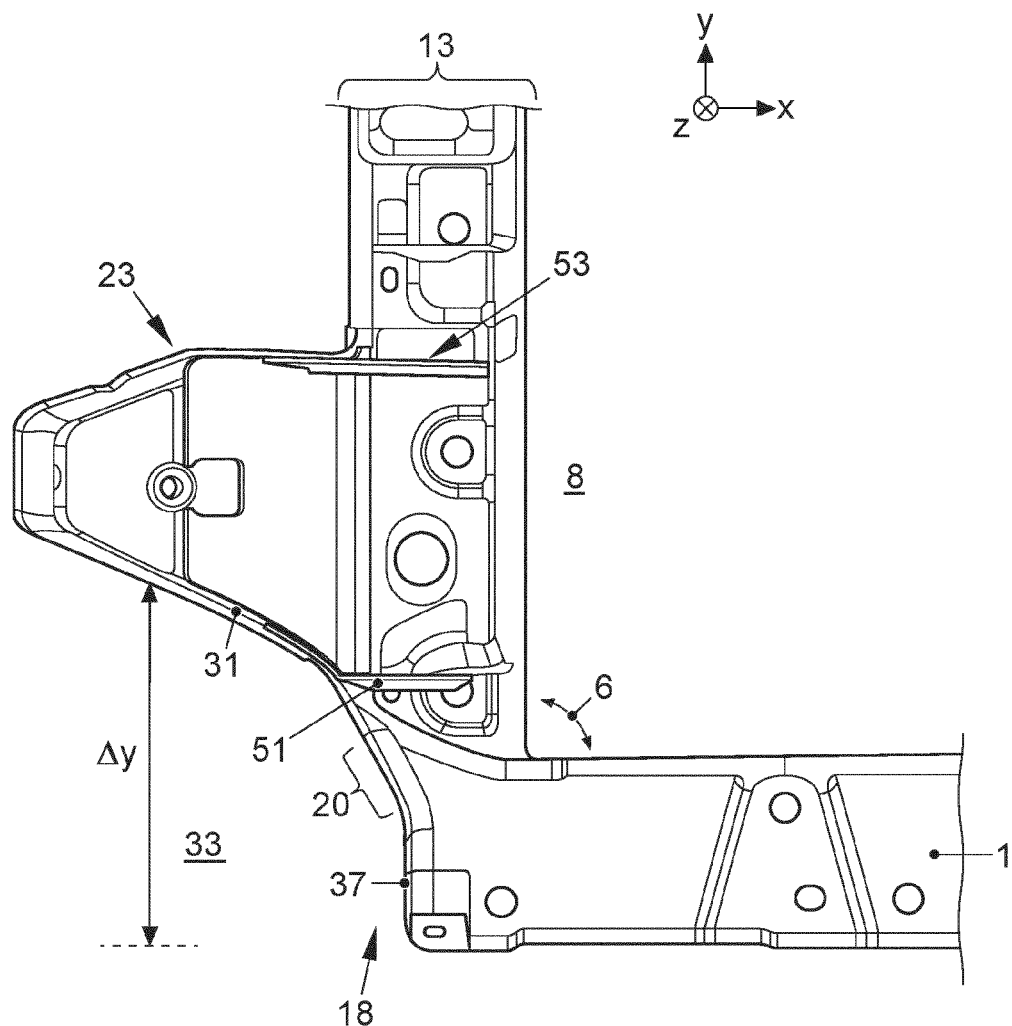

With regard to an enlargement of the installation space for the traction battery 9, according to FIG. 7 the respective rocker panel 1 is offset toward the exterior of the vehicle with respect to the rear body longitudinal member 23 by a lateral offset Δy in the vehicle transverse direction y. This lateral offset Δy is bridged toward the front of the vehicle with the aid of the interposed rear corner joint 18. This means that the rear corner joint 18 widens in the transverse vehicle direction y toward the vehicle front, taking up the lateral offset Δy, by which means a rigid, force-transmitting rocker panel connecting point 20 of the rear body longitudinal member 23 is achieved at the rocker panel 1.

Figure 4:
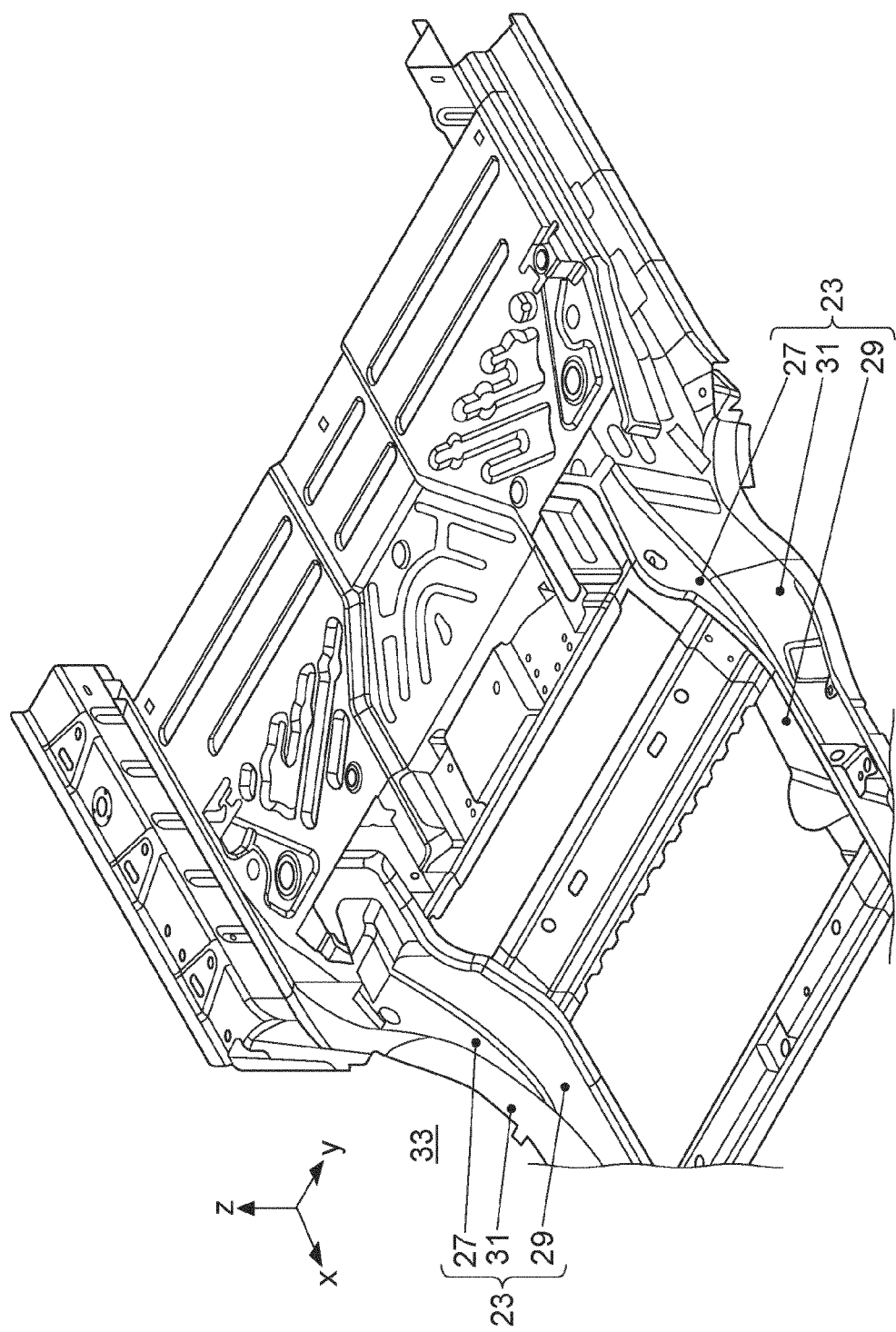
FIG. 4 is a rear-end region of the undercarriage of the body structure in a perspective partial sectional view.
Figure 5:
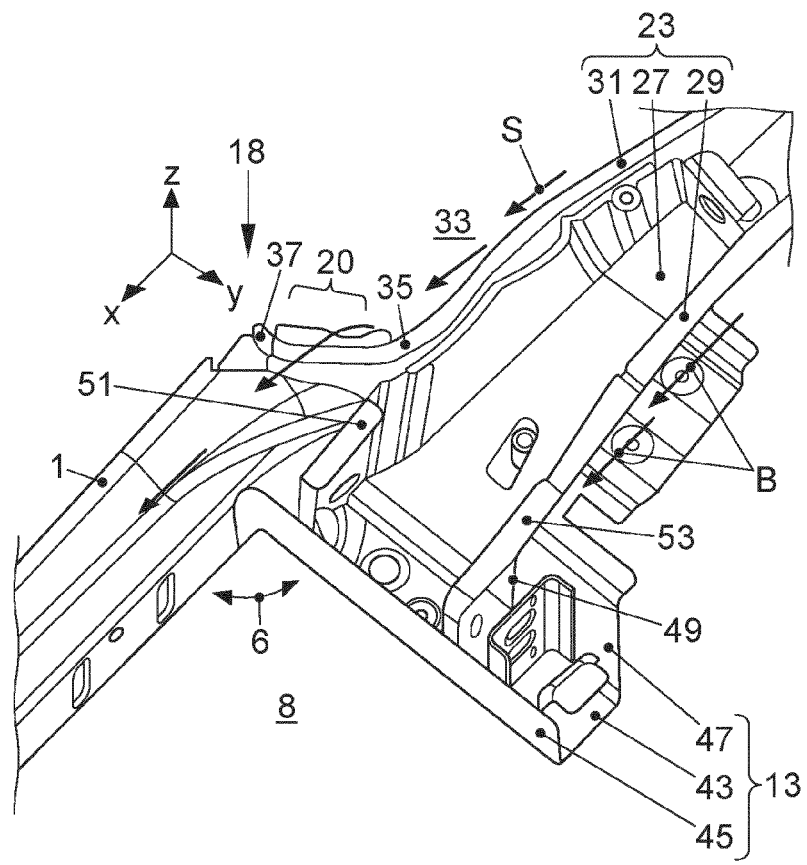
FIGS. 5 to 7 are various different views of the rear-end corner joint.

As is evident from FIG. 4 or 5, the rear body longitudinal member 23 is a steel profile part that is U-shaped in cross-section with a longitudinal member floor 27 as well as inner side wall 29 and outer side wall 31 raised therefrom. The U-profile of the rear body longitudinal member 23, which is open toward the top, is closed in the assembled state by a rear floor pan part 10 (FIG. 3). As is further evident from FIG. 5, the outer side wall 31 of the rear body longitudinal member 23 delimits a wheel space 33 of the rear-end wheel well toward the interior of the vehicle in the transverse vehicle direction y.

For the purpose of forming a rigid rocker panel connecting point 20, in FIG. 5 the outer side wall 31 of the rear body longitudinal member 23 is lengthened toward the front of the vehicle at a transition edge 35 with a rocker panel end piece 37. The rocker panel end piece 37 is angled toward the exterior of the vehicle at the transition edge 35. At the rocker panel end piece 37, the rocker panel 1 terminates in a force-transmitting manner. Moreover, the rocker panel end piece 37 delimits the wheel space 33 of the rear-end wheel well toward the front of the vehicle.

Figure 6:
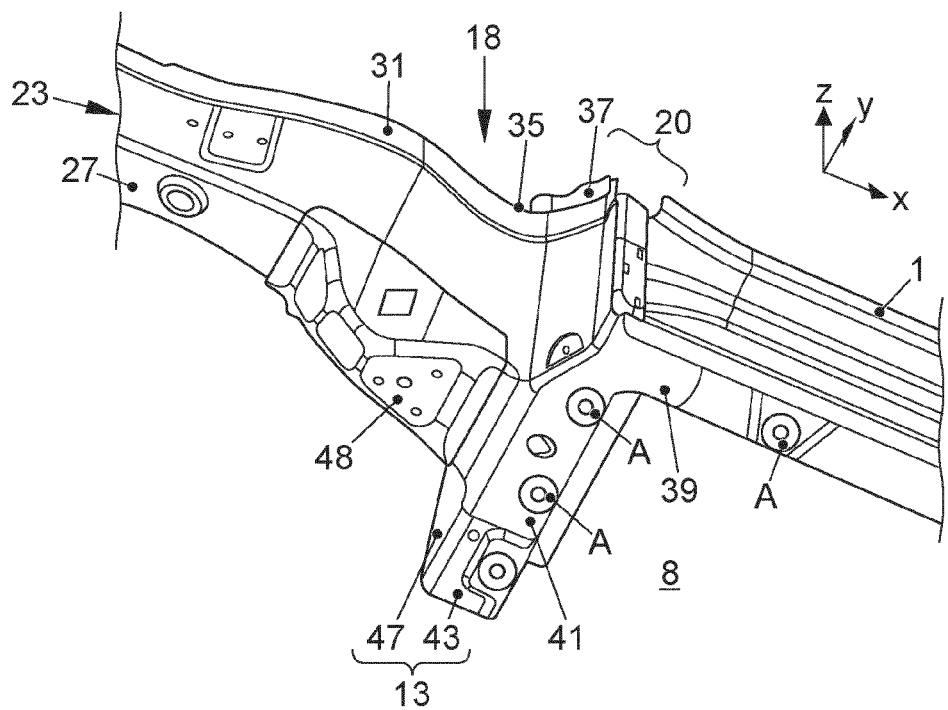

For a rigid design of the rocker panel connecting point 20, the longitudinal member floor 27 of the rear body longitudinal member 23 is lengthened toward the front of the vehicle with a joining section 39 (FIG. 6). This section engages under the rocker panel 1 and is connected to the rocker panel underside in a force-transmitting manner (by weld joint, for example).

Below, the connection of the rear body longitudinal member 23 to the rear battery cross member 13 is explained on the basis of FIG. 5. Accordingly, the longitudinal member floor 27 of the rear body longitudinal member 23 is lengthened toward the front of the vehicle with a floor segment 41. The floor segment 41 engages under the rear battery cross member 13 and is connected to it in a force-transmitting manner, creating a double-wall structure. According to FIG. 6, the joining section 39 provided for connecting the rocker panel projects forward in the longitudinal vehicle direction x from the floor segment 41, which is provided for connecting the battery cross member.

In FIG. 5, the rear battery cross member 13 is a U-shaped steel profile part with a cross member floor 43 as well as front side wall 45 and rear side wall 47 raised therefrom. The cross member profile, which is open toward the top, is closed in the assembled state by the rear floor pan part 10. With regard to a rigid longitudinal member connection, in FIG. 6 the floor segment 41 of the rear body longitudinal member 23 and the cross member floor 43 are connected to one another, creating a double-wall structure as a rigid assembly (by weld joint, for example).

In FIG. 5, the front side wall 45 of the battery cross member 13 directly delimits the battery installation space 8. In addition, the front side wall 45 of the battery cross member 13 is carried in the transverse vehicle direction y until it is in force-transmitting contact with the rocker panel 1, namely while forming an interior corner region 6, which encloses a corner of the traction battery 9 in the assembled state.

The rear side wall 47 of the rear battery cross member 13 has, in FIG. 5, an assembly cutout 49 through which a rocker panel partition part 51 and a battery partition part 53 extend. The rocker panel partition part 51 lengthens the outer side wall 31 of the rear body longitudinal member 23 until it is in force-transmitting contact with the front side wall 45 of the battery cross member 13. In the same manner, the battery partition part 53 lengthens the inner side wall 29 of the rear body longitudinal member 23 through the assembly cutout 49 until it is in force-transmitting contact with the front side wall 45 of the battery cross member 13.

In the event of a rear-end collision, a rocker panel load path S (FIG. 5) is produced that incorporates the outer side wall 31 as well as the longitudinal member floor 27 of the rear body longitudinal member 23, the rocker panel partition part 51, and the rocker panel 1. Parallel to the rocker panel load path S, a battery load path B is formed in FIG. 5. The inner side wall 29 as well as the longitudinal member floor 27 of the rear body longitudinal member 23, the battery partition part 53, and the front side wall 45 of the rear battery cross member 13 are incorporated into the battery load path B.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A body structure for an electrically operated vehicle, the body structure comprising:

an installation space for a traction battery, the installation space being open toward a vehicle bottom in a vertical vehicle direction and is closed toward a vehicle top by a floor pan part that forms a vehicle floor and is delimited on both sides in a vehicle transverse direction by a rocker panel that delimits a side-door opening toward the vehicle bottom; and a rear body longitudinal member that transitions into a respective rocker panel toward a vehicle front in a longitudinal vehicle direction and extends on each vehicle side in a rear end region, wherein a rear corner of the traction battery is enclosed by an interior corner region that is right-angled and that stretches between the respective rocker panel and a rear battery cross member, wherein the respective rocker panel on each side of the vehicle is offset toward the exterior of the vehicle with respect to the rear body longitudinal member by a lateral offset in the vehicle transverse direction, wherein a rear corner joint adjoins the rear body longitudinal member toward the vehicle front in the longitudinal vehicle direction, the rear corner joint being widened toward the vehicle front in the longitudinal vehicle direction taking up a lateral offset, and the rear corner joint being connected to the respective rocker panel in a force-transmitting manner at a rocker panel connecting point, and wherein the rear body longitudinal member is a profile part having a U-shaped profile in cross-section with a longitudinal member floor as well as inner and outer side walls raised therefrom, and wherein the U-shaped profile of the rear body longitudinal member, which is open toward a top, is closed in an assembled state by the floor pan part, and wherein the outer side wall of the rear body longitudinal member delimits a wheel space of a rear-end wheel well toward an interior of the vehicle.

2. The body structure according to claim 1, wherein, in order to form the rocker panel connecting point, the outer side wall of the rear body longitudinal member is lengthened toward the vehicle front at a transition edge with a rocker panel end piece, and wherein the respective rocker panel terminates at the rocker panel end piece and/or the rocker panel end piece delimits the wheel space of the rear-end wheel well toward the vehicle front.

3. The body structure according to claim 1, wherein, in order to form the rocker panel connecting point, the longitudinal member floor of the rear body longitudinal member is lengthened toward the vehicle front with a joining section that engages under the respective rocker panel and is connected to the respective rocker panel in a force-transmitting manner.

4. The body structure according to claim 1, wherein, in order to connect the rear body longitudinal member to the rear battery cross member, the longitudinal member floor is lengthened toward the vehicle front with a floor segment that engages under the rear battery cross member and is connected to the rear battery cross member in a force-transmitting manner.

5. The body structure according to claim 4, wherein the floor segment of the rear body longitudinal member and a cross member floor of the rear battery cross member are connected to one another, creating a double-wall structure as a rigid assembly.

6. A body structure for an electrically operated vehicle, the body structure comprising:

an installation space for a traction battery, the installation space being open toward a vehicle bottom in a vertical vehicle direction and is closed toward a vehicle top by a floor pan part that forms a vehicle floor and is delimited on both sides in a vehicle transverse direction by a rocker panel that delimits a side-door opening toward the vehicle bottom; and a rear body longitudinal member that transitions into a respective rocker panel toward a vehicle front in a longitudinal vehicle direction and extends on each vehicle side in a rear end region, wherein a rear corner of the traction battery is enclosed by an interior corner region that is right-angled and that stretches between the respective rocker panel and a rear battery cross member, wherein the respective rocker panel on each side of the vehicle is offset toward the exterior of the vehicle with respect to the rear body longitudinal member by a lateral offset in the vehicle transverse direction, wherein a rear corner joint adjoins the rear body longitudinal member toward the vehicle front in the longitudinal vehicle direction, the rear corner joint being widened toward the vehicle front in the longitudinal vehicle direction taking up a lateral offset, and the rear corner joint being connected to the respective rocker panel in a force-transmitting manner at a rocker panel connecting point, and wherein the rear battery cross member is a U-shaped profile part with a cross member floor as well as front and rear side walls raised therefrom, and wherein the U-shaped profile part, which is open toward a top, is closed in an assembled state by the floor pan part, and wherein the front side wall of the rear battery cross member delimits the installation space for the traction battery and/or is in force-transmitting contact with the respective rocker panel in the vehicle transverse direction, while forming the interior corner region.

7. The body structure according to claim 6, wherein the rear side wall of the rear battery cross member has an assembly cutout and wherein an outer side wall of the rear body longitudinal member is lengthened with a rocker panel partition part that is passed through the assembly cutout of the rear side wall of the rear battery cross member until force-transmitting contact is made with the front side wall of the rear battery cross member.

8. The body structure according to claim 7, wherein, in the event of a rear-end collision, a rocker panel load path is formed that incorporates the outer side wall of the rear body longitudinal member, a longitudinal member floor of the rear body longitudinal member, the rocker panel partition part, and the respective rocker panel.

9. The body structure according to claim 8, wherein an inner side wall of the rear body longitudinal member is lengthened with a battery partition part that is passed through the assembly cutout of the rear side wall of the rear battery cross member until force-transmitting contact is made with the front side wall of the rear battery cross member, and wherein, in the event of a rear-end collision, a battery load path is formed that incorporates the inner side wall of the rear body longitudinal member, the longitudinal member floor of the rear body longitudinal member, the battery partition part, and the front side wall of the rear battery cross member.

* * * * *